(12) United States Patent
Padilla (10) Patent No.: US 7,993,042 B2
(45) Date of Patent: Aug. 9, 2011

(54) AUTOMOBILE INTERIOR ENTERTAINMENT LIGHTING SYSTEM

(76) Inventor: Steven Padilla, Tallahassee, FL (US)

( * ) Notice: Subject to any disclaimer, the term of this patent is extended or adjusted under 35 U.S.C. 154(b) by 64 days.

(21) Appl. No.: 12/220,381

(22) Filed: Jul. 24, 2008

(65) Prior Publication Data

US 2010/0020560 A1  Jan. 28, 2010

Related U.S. Application Data (60) Provisional application No. 61/005,503, filed on Dec. 5, 2007.

(51) Int. Cl.
*B60Q 1/00* (2006.01)

(52) U.S. Cl. ......................................... 362/488; 362/490
(58) Field of Classification Search .................. 362/493, 362/488–492, 471, 231, 277, 512, 513, 282, 362/284, 324, 806, 809; 40/593
See application file for complete search history.

(56) References Cited

U.S. PATENT DOCUMENTS

| 7,287,886 | B2 * | 10/2007 | Iwai | 362/490 |
| 7,581,858 | B1 * | 9/2009 | Gallegos | 362/488 |
| 2008/0239739 | A1 * | 10/2008 | Griesinger | 362/488 |
| 2009/0213602 | A1 * | 8/2009 | Gallegos | 362/488 |

* cited by examiner

Primary Examiner — Bao Q Truong
(74) Attorney, Agent, or Firm — J. Wiley Horton (57) ABSTRACT

An entertainment lighting system for an automobile interior. The invention is configured to be mounted to the interior of an automobile's roof in the position customarily occupied by the dome light. Power is preferably provided by the automobile's electrical circuitry intended to power the dome light. The invention includes a dome which projects an array of lighting effects. Flashing strobes are also provided. The strobes are preferably synchronized to the beat of music playing within the car. A black light and low power laser are optionally provided.

20 Claims, 7 Drawing Sheets

ND ENTERTAINMENT
AUTOMOBILE INTERIOR ENTERTAINMENT LIGHTING SYSTEM

CROSS-REFERENCES TO RELATED APPLICATIONS

The current application claims the benefit, pursuant to 37 C.F.R. section 1.53(c), of an earlier-filed provisional patent application. The provisional application was filed on Dec. 5, 2007 and was assigned application Ser. No. 61/005,503. It listed the same inventor.

BACKGROUND OF THE INVENTION

1. Field of the Invention

This invention relates to the field of automobile interior lighting. More specifically, the invention comprises an entertainment lighting system which optionally replaces the conventional dome light.

2. Description of the Related Art

There are many known devices for lighting the interior of an automobile. Most of these are small incandescent bulbs placed behind suitable diffusers or reflectors. One good example is the "dome light," which is traditionally mounted on the interior of a car's roof. The dome light is often set to illuminate automatically when a door is opened. A manual control is often also provided so that the driver can turn on the light with the doors closed. A rheostat or other type of dimmer switch may also be provided, so that the driver can adjust the dome light's brightness. The dome light's location is provided with a +12 VDC lead and a ground lead. The provide power to the dome light.

In recent years interior lights intended primarily for entertainment have become more common. Decorative neon and LED lights are examples of entertainment lighting. These are intended primarily to provide a pleasing aesthetic effect. Most of these lights are static in nature. Their brightness and color may be varied, but their positions typically do not change.

Of course, entertainment lighting systems intends for static locations—such as discos—are typically much more sophisticated. These include flashing strobes, rotating "disco balls", black lights, and similar items. This level of sophistication has not been used in the lighting of automobile interiors. The present invention seeks to provide such a sophisticated lighting system for the interior of an automobile.

BRIEF SUMMARY OF THE PRESENT INVENTION

The present invention comprises an entertainment lighting system for an automobile interior. The invention is configured to be mounted to the interior of an automobile's roof in the position customarily occupied by the dome light. Power is preferably provided by the automobile's electrical circuitry intended to power the dome light.

The invention includes a dome which projects an array of colorful lighting effects. Flashing strobes are also provided. The entire unit is preferably synchronized to the beat of music playing within the car, preferably by the use of a preprogrammed sound interface. A black light and low power laser are optionally provided.

Control features are preferably provided so that the user can vary the lighting effects to suit individual tastes. The control features preferably include the ability to vary the speed of the rotating lighting effects, the flashing frequency of the strobes, the intensity of the lighting, and the color of the lighting. These can be controlled individually or as a group through the preprogrammed functions. The invention preferably also includes at least one conventional dome light, so that the functions of the conventional dome light are not lost.

REFERENCE NUMERALS IN THE DRAWINGS

| | | | |
|---|---|---|---|
| 10 | auto lighting system | 12 | housing |
| 14 | dome | 16 | conventional light |
| 18 | auxiliary power input | 20 | light portal |
| 22 | strobe | 24 | control knob |
| 26 | control switch | 28 | mounting plate |
| 30 | standoff | 32 | motor |
| 34 | attachment feature | 36 | attachment feature |
| 38 | control device | 40 | existing dome light circuit |
| 42 | power source | 44 | dome light switch |
| 46 | rheostat | 48 | microphone |
| 50 | noise filter | 52 | rheostat |
| 54 | light show synchronizer | 56 | audio amplifier output |
| 58 | red LED | 60 | white LED |
| 62 | blue LED | 64 | black light |
| 66 | motor spindle | 68 | laser |
| 70 | remote control | 72 | optional battery |
| 74 | opaque portion | 76 | filter holder |
| 78 | filter | 80 | spindle receiver |
| 82 | LED | | |

DETAILED DESCRIPTION OF THE INVENTION

Figure 1:
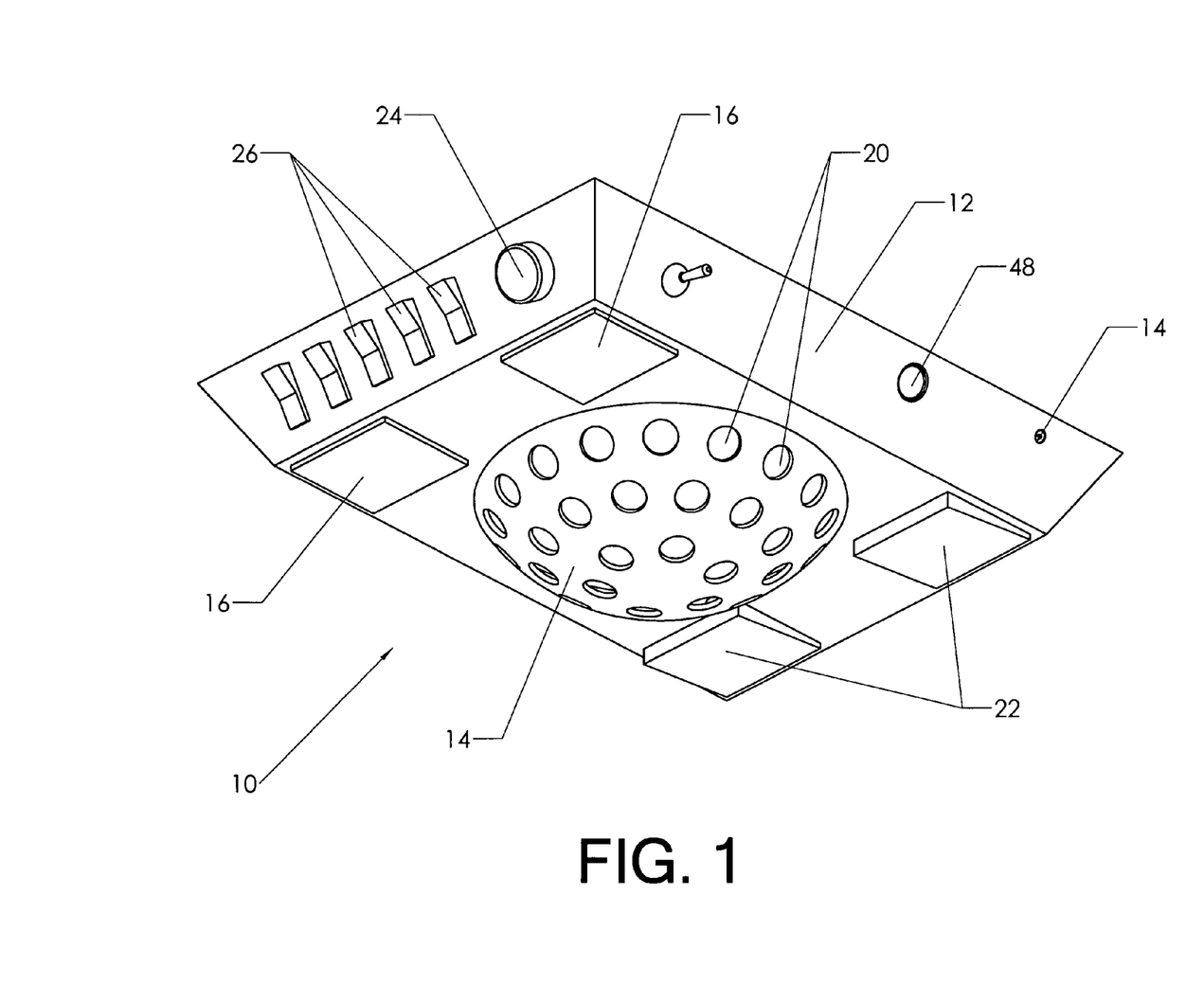
FIG. 1 is a perspective view, showing the present invention.

FIG. 1 shows a perspective view of the present invention in an assembled state. Auto lighting system 10 includes housing 12, which contains various components. It is configured to be attached to the interior of an automobile in the position customarily occupied by a dome light. Dome 14 attaches to the housing. It is illuminated from within. An array of light portals 20 (typically just transparent opening in the otherwise opaque surface of the dome) allow beams of light to escape the dome. The dome preferably projects a rotating lighting pattern. This can be achieved by physically rotating the dome or by staging the projected lights in a sequence to simulate rotation (explained subsequently). In the preferred embodiment, the dome itself rotates. This action throws a plurality of light beams in a moving pattern around the car's interior.

A pair of conventional lights 16 is preferably mounted on the housing's forward portion. These replace the function of the original dome light. They preferably illuminate when a vehicle door is opened. They can also be preferably switched on manually.

A pair of strobes 22 is preferably mounted on a portion of the housing, preferably facing rearward so as not to impair the driver's vision. They flash periodically to add an entertaining lighting effect. Microphone 48 is provided to sense the sounds within the car—typically music being played on the audio system. The invention includes the option of synchronizing the lighting effects to the music being played within the car—as will be explained subsequently.

The invention is preferably electrically connected to the car circuit which powers the dome light. This allows the user to turn the unit on by pressing a switch on the car's dash (in most models). However, other optional power sources may also be provided. Auxiliary power input 18 allows a power cord to be connected to another source—such as the car's cigarette lighter.

A variety of user controls may be provided, with these being located on the housing's exterior, actuated by a separate remote control, or both. As many users will wish to configure the entertainment system to suit a particular taster, a large number of controls are preferable. These are ideally placed where the driver can easily reach them, such as on the housing's forward portion (as shown in FIG. 1). As an example, control knob 24 can be provided to vary the intensity of the light beams emitted by dome 14. Control switches 26 may likewise be provided to turn the dome on and off, turn the strobes on an off, synchronize the lighting effects to the music, etc. A keypad or touchpad can also be provided to allow the user to preprogram desired sets or sequences of lighting effects. The device would then be equipped with a memory means to store the features entered by the user.

Figure 2:
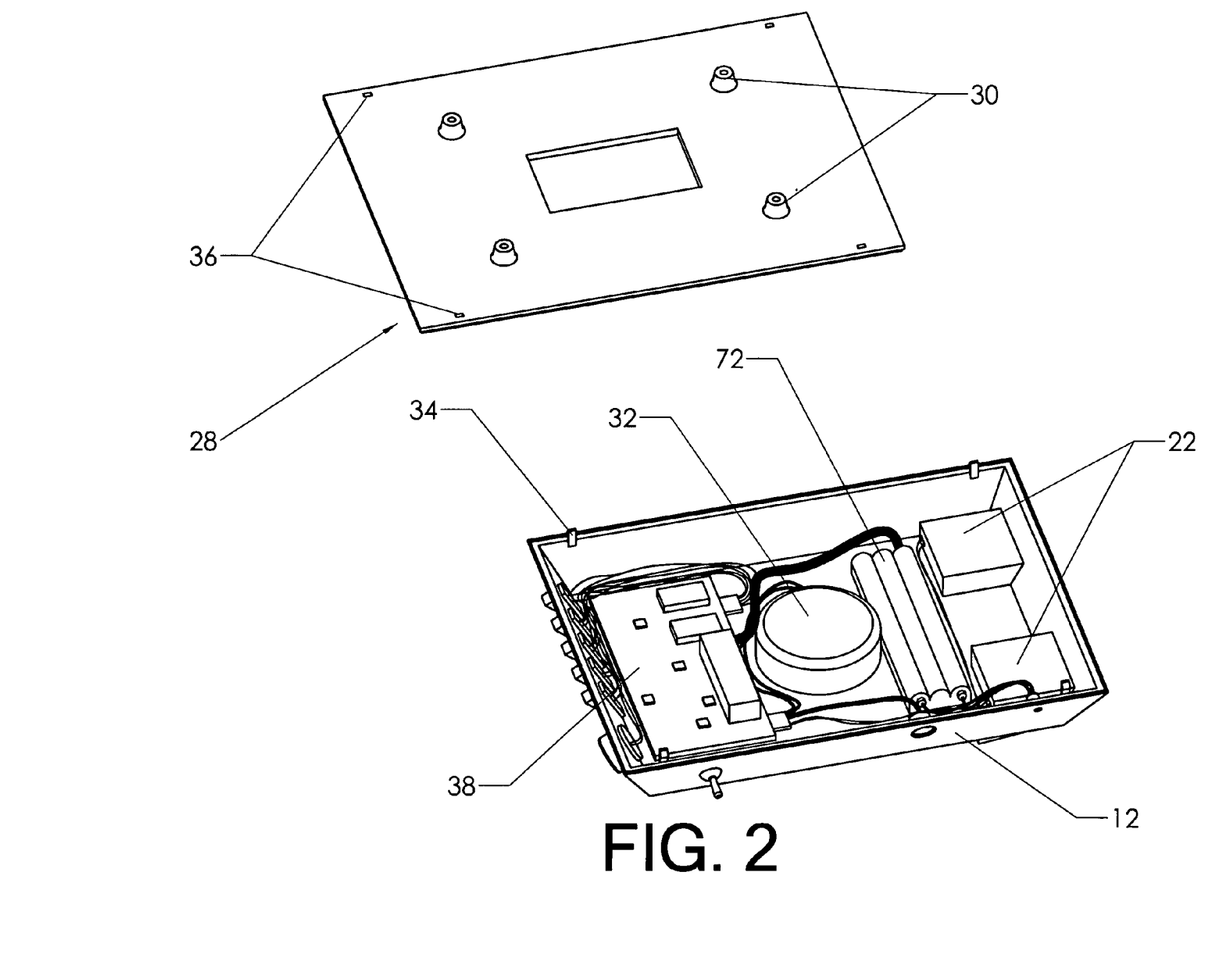
FIG. 2 is an exploded perspective view, showing the housing separated from the mounting plate.

Of course, the invention ideally includes installation features allowing it to be readily installed. FIG. 2 shows one example of such installation features, though the reader should bear in mind that many other possibilities exist. FIG. 2 is an exploded perspective view. Mounting plate 28 is designed to be attached to the roof of the car using threaded fasteners, adhesives, and the like. Those skilled in the art will know that most car roofs have two layers with a gap in between. The fasteners connect the mounting plate to the lower of these two layers. Standoffs 30 may be provided to offset the mounting plate from the underside of the car's roof.

Housing 12 includes features that allow it to be conveniently attached to the mounting plate. Attachment features 34 on housing 12 are positioned to engage attachment features 36 on mounting plate 28. The specific example shown uses snap features. The installer can attach the mounting plate, and then connect the desired electrical conductors (such as connecting the invention to the dome light circuit in the car). The housing can then be attached to the mounting plate by aligning the attachment features and pressing the housing up into place.

FIG. 2 also shows some other component contained within housing 12. Motor 32 is a rotating drive means. It rotates dome 14. Control device 38 is also provided. This is preferably a printed circuit board containing suitable electronic components such a memory chips, etc. for storing desired preprogrammed lighting effects. Optional battery 72 can be provided to power the device in the event of an interruption or as a main source of power for applications where a different source is impractical. Alternatively, battery power can be used exclusively. All the electronic components are electrically connected using conductors. Alternatively, a single larger printed circuit board could be configured to span the housing's entire interior.

Figure 3:
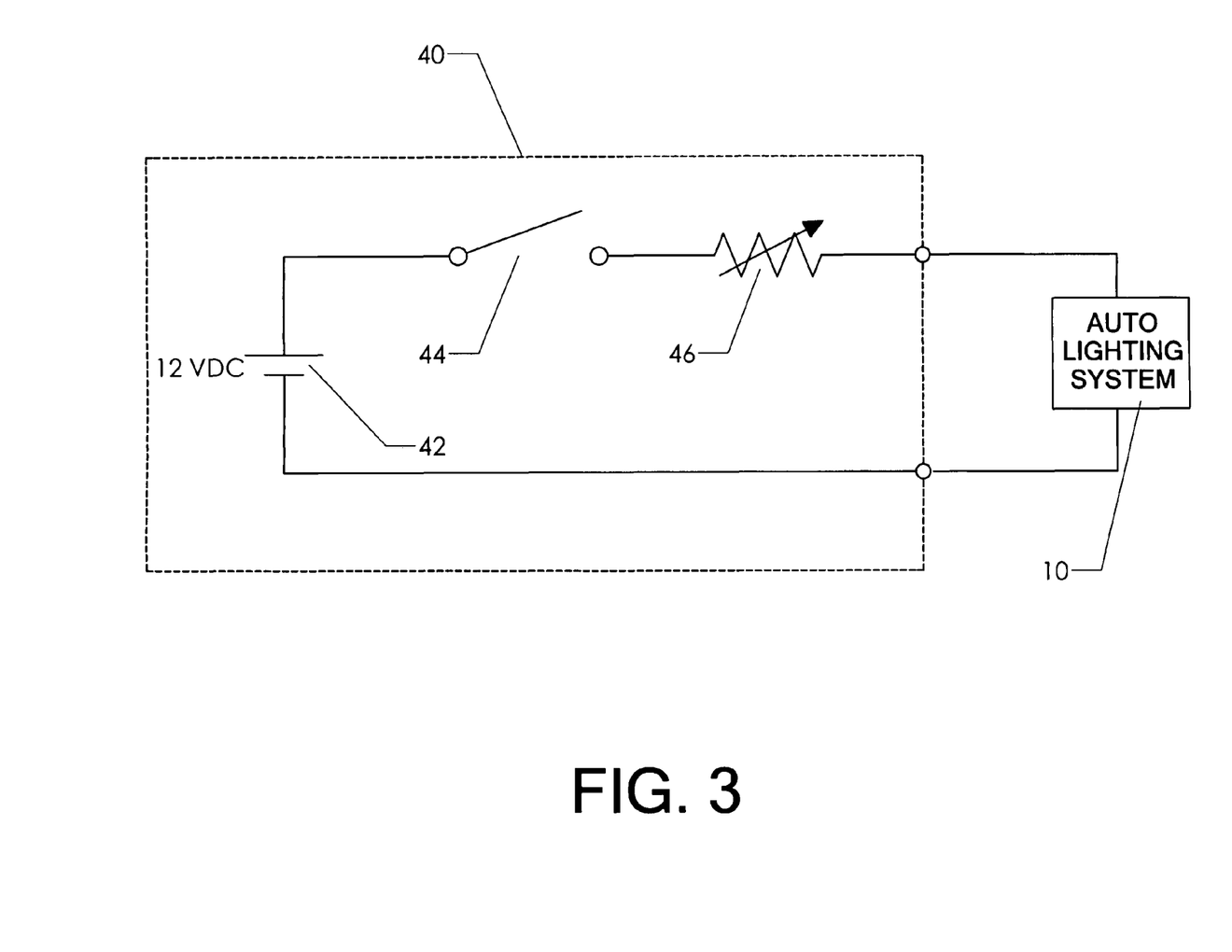
FIG. 3 is a schematic view, showing how the invention may optionally be connected to the automobile's existing circuitry.

FIG. 3 shows a simplified schematic. Auto lighting system 10 can be wired directly to existing dome light circuit 40 in the automobile. This allows the car's power source 42—typically a battery and/or alternator—to provide power to the invention. Dome light switch 44, often located in a car's dashboard, can then be used to turn the invention on and off. Some cars also contain a rheostat 46, which can be used to vary the amount of voltage powering the invention. An auxiliary power input may also be included in this circuit, though this is not shown in the view.

Figure 4:
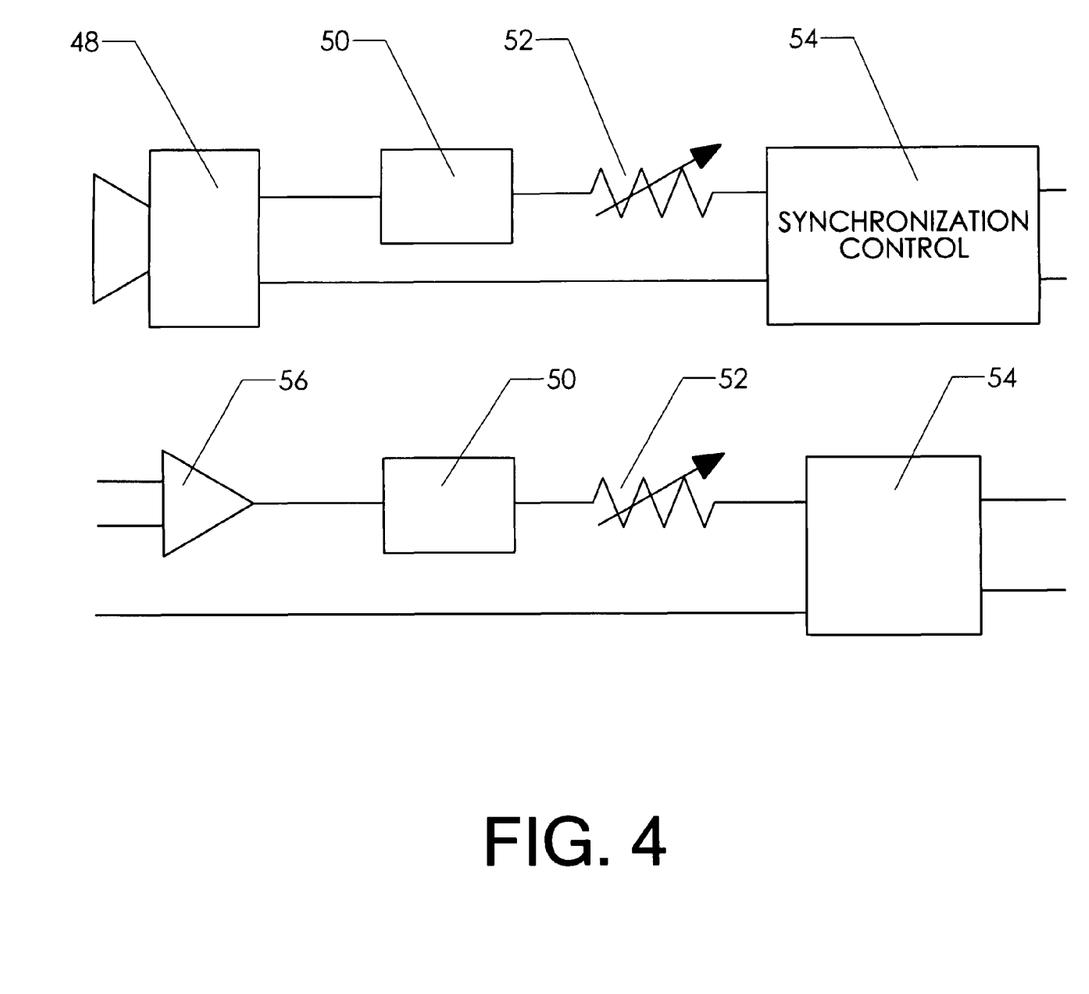
FIG. 4 is a schematic view, showing how different inputs can be used to synchronize the invention's strobe flashes with music being played in the car.

A preferred embodiment of the invention allows the flashing of the strobes and the other lighting effects to be synchronized with music playing over the car's audio system. In order to accomplish this objective, the invention needs to be able to sense pulses in the sound within the car. This could be done in many ways. FIG. 4 shows two methods. In the upper view, microphone 48 is provided. It senses the music within the car. A suitable noise filter 50 is preferably employed to eliminate false signals. The resulting signal is then fed to light show synchronizer 54, which causes the strobes to pulse every time a loud "beat" in the music is sensed, and can also synchronize the other lighting effects (such as color changes, rotation rate, etc.).

The lower view of FIG. 4 shows another approach. In this view, a conductor is routed directly from audio amplifier output 56. It passes through a noise filter and then onto the light show synchronizer. The results of the two approaches in the same, through the approach using the microphone is simpler to install.

Figure 5:
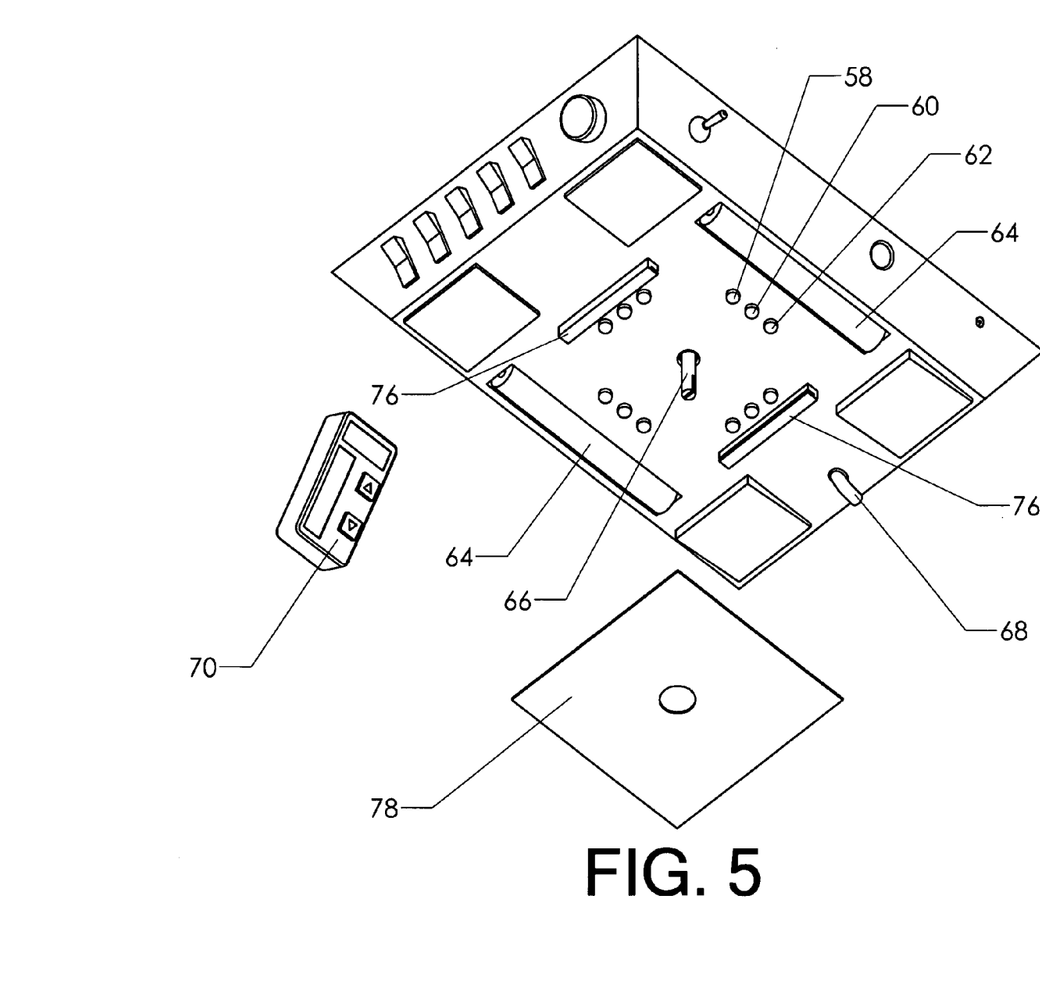
FIG. 5 is an exploded perspective view, showing how the dome is illuminated.

FIG. 5 shows a perspective view of the underside of housing 12 with the dome being removed. Motor spindle 66 extends downward and provides a connection point for dome 14. The dome is preferably illuminated from inside. This can be done with simple incandescent bulbs. Another approach is to use light emitting diodes (LED's). Four arrays of LED's are shown in FIG. 5. Since it is also desirable to change the color of the illumination source, each LED array preferably includes different color LED's. The embodiment of FIG. 5 shows red LED's 58, white LED's 60, and blue LED's 62 (Those skilled in the art will know that other colors are available). The control circuitry can be used to pulse and vary the colors emitted by cycling through the various LED's as the dome rotates.

Another approach is to use a light source of a single color and vary the emitted color using colored filters. The embodiment of FIG. 5 includes two filter holders 76. These receive and hold color filter 78. A rotating multi-colored filter could also be used, such as those employed in theatrical lighting systems.

FIG. 5 depicts additional optional features intended to enhance the novelty of the lighting system. A pair of black lights 64 is included. Likewise, one or more low powered lasers 68 can be added to project beams in various directions.

The invention can be controlled in a variety of different ways. One approach is to provide buttons or switches within easy reach of the driver. However, some drivers may not wish to reach overhead to actuate these features. Thus, remote control 70 can be provided. This remote control can be mounted on the vehicle's dash or attached to a key ring. It preferably operates on radio frequency transmissions so that it does not have to be pointed in any particular direction.

Figure 6:
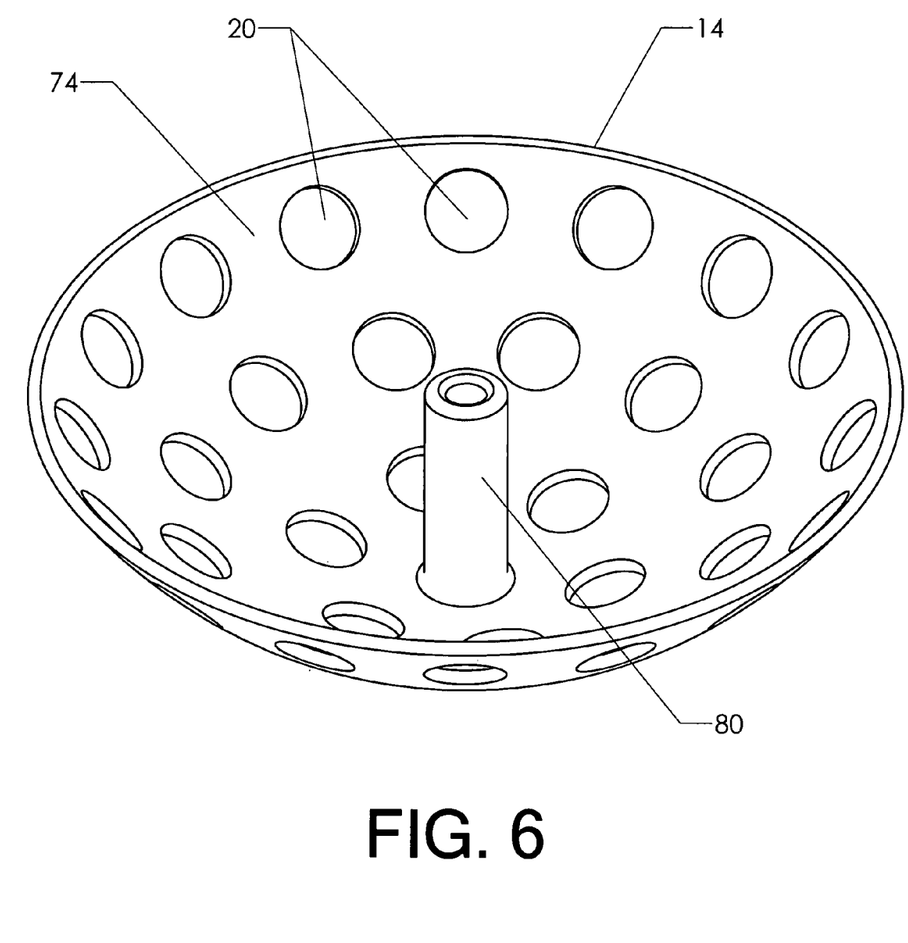
FIG. 6 is a perspective view, showing some details of the dome.

FIG. 6 shows the hollow interior of dome 14. It includes spindle receiver 80 which is sized and positioned to attach to motor spindle 66. The dome includes an array of light portals, which project beams of light in operation. These can be created in a variety of ways. One good approach is to mold the dome from transparent material, then coat the surface of the dome with an opaque coating while masking off the portal locations. Many other approaches are known to those skilled in the art. The embodiment of FIG. 6 is suitable for those versions where the dome itself rotates.

Figure 7:
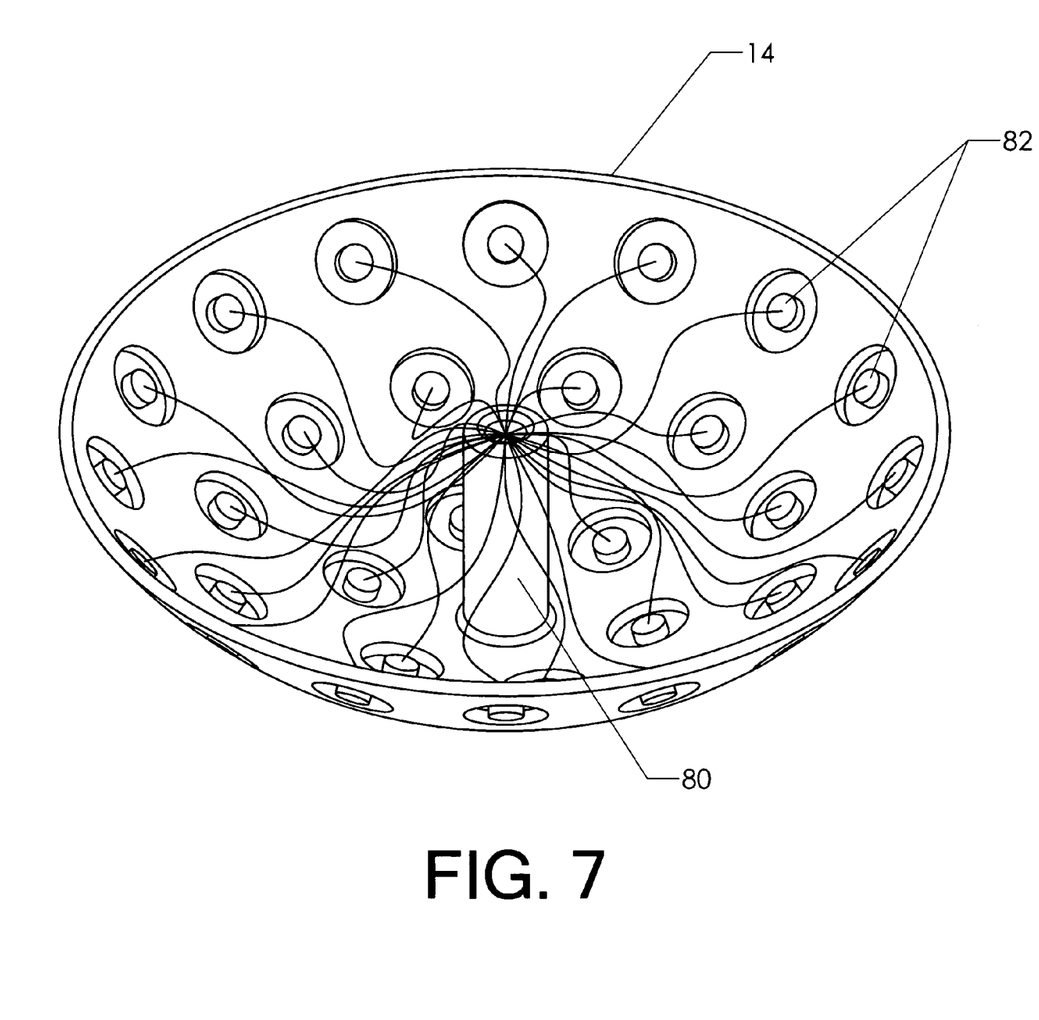
FIG. 7 is a perspective view, showing an alternate embodiment of the dome.

The rotating effect could be created using different approaches. As an example, rather than using an actual dome, a staged sequence of LED's could be used to create the rotating effect. Turning to FIG. 7, the reader will observe an alternate embodiment in which each port in the radial arrays of ports 20 has been replaced by an LED 82. If an LED is placed in the position of each port 20, and then flashed in an appropriate sequence, a rotating effect can be achieved without physically rotating the dome. Of course, the LED placement of FIG. 7 can also be combined with a physically rotating dome, provided that power is provided to the LED's through slip rings or other connections able to accommodate the rotation. Thus, the term "rotating light beams" should be understood to encompass both a physically rotating dome and a staged sequence of lights used to create a rotating effect.

Although the preceding description contains significant detail, it should not be construed as limiting the scope of the invention but rather as providing illustrations of the preferred embodiments of the invention. As an example, the control features illustrated could take many different forms. One alternative would be a small LCD display with a few contact buttons for making selections within a menu structure. Such a variation would not materially alter the nature of the invention. Thus, the scope of the invention should be fixed by the following claims rather than any specific examples provided.

Having described my invention, I claim:

1. An automobile interior entertainment lighting system configured for attachment to the interior roof of an automobile, said automobile including a dome light circuit, comprising:
   a. a housing configured to be attached to said interior roof of said automobile;
   b. rotating drive means mounted to said housing;
   c. a dome attached to said rotating drive means;
   d. wherein said dome is configured to project a plurality of light beams; and
   e. at least one dome light.

2. An automobile interior entertainment lighting system as recited in claim 1, wherein power to said rotating drive means comprises said dome light circuit.

3. An automobile interior entertainment lighting system as recited in claim 1, further comprising at least one strobe.

4. An automobile interior entertainment lighting system as recited in claim 1, wherein said rotating drive means is controlled independently from said dome light.

5. An automobile interior entertainment lighting system as recited in claim 3, further comprising at least one black light.

6. An automobile interior entertainment lighting system as recited in claim 3, further comprising at least one laser.

7. An automobile interior entertainment lighting system as recited in claim 1, further comprising a control for varying the speed of rotation of said rotating drive means.

8. An automobile interior entertainment lighting system as recited in claim 1, further comprising a control for varying the intensity of said plurality of light beams.

9. An automobile interior entertainment lighting system as recited in claim 1, further comprising a control for varying the color of said plurality of light beams.

10. An automobile interior entertainment lighting system configured for attachment to the interior roof of an automobile, said automobile including a dome light circuit and an audio system for playing music, comprising:
    a. a housing configured to be attached to said interior roof of said automobile;
    b. a dome attached to said housing;
    c. wherein said dome is configured to project a plurality of rotating light beams;
    d. at least one strobe light; and
    e. wherein said at least one strobe light is synchronized with said music from said audio system.

11. An automobile interior entertainment system as recited in claim 10, further comprising:
    a. a detector for detecting said music being played by said audio system; and
    b. a light show synchronizer unit which synchronizes the flashes of said at least one strobe with said music.

12. An automobile interior entertainment system as recited in claim 10, wherein said detector is a microphone.

13. An automobile interior entertainment system as recited in claim 10, wherein said detector is an electrical conductor connected to an output of said audio system.

14. An automobile interior entertainment lighting system as recited in claim 10, wherein power to said automobile interior entertainment lighting system comprises said dome light circuit.

15. An automobile interior entertainment lighting system as recited in claim 10, further comprising at least one strobe.

16. An automobile interior entertainment lighting system as recited in claim 10, wherein said automobile interior entertainment lighting system is controlled independently from said dome light.

17. An automobile interior entertainment lighting system as recited in claim 10, further comprising at least one black light.

18. An automobile interior entertainment lighting system as recited in claim 10, further comprising at least one laser.

19. An automobile interior entertainment lighting system as recited in claim 10, further comprising a control for varying the speed of rotation of said plurality of rotating light beams.

20. An automobile interior entertainment lighting system as recited in claim 10, further comprising a control for varying the intensity of said plurality of light beams.

* * * * *